(12) United States Patent
Wang

(10) Patent No.: US 8,248,525 B2
(45) Date of Patent: Aug. 21, 2012

(54) CAMERA MODULE AND ELECTRONIC DEVICE USING SAME

(75) Inventor: Shi-Feng Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 99 days.

(21) Appl. No.: 12/878,238

(22) Filed: Sep. 9, 2010

(65) Prior Publication Data

US 2012/0044410 A1    Feb. 23, 2012

(30) Foreign Application Priority Data

Aug. 17, 2010    (CN) .......................... 2010 1 0255543

(51) Int. Cl.
 *H04N 5/225* (2006.01)
(52) U.S. Cl. ...................................................... 348/374
(58) Field of Classification Search ........... 348/373–376
 See application file for complete search history.

(56) References Cited

U.S. PATENT DOCUMENTS

| 2009/0016024 A1* | 1/2009 | Chao et al. ..................... 361/704 |
| 2009/0052037 A1* | 2/2009 | Wernersson ..................... 359/554 |
| 2010/0284143 A1* | 11/2010 | Lev et al. .................. 361/679.55 |

\* cited by examiner

*Primary Examiner* — Tuan Ho
*Assistant Examiner* — Shahbaz Nazrul
(74) *Attorney, Agent, or Firm* — Altis Law Group, Inc.

(57) ABSTRACT

A camera module includes a printed circuit board and a camera mounted to the printed circuit board. The printed circuit board further defines a at least one cut-out located near the camera.

10 Claims, 3 Drawing Sheets

CAMERA MODULE AND ELECTRONIC DEVICE USING SAME

BACKGROUND

1. Technical Field

This disclosure generally relates to camera modules, and particularly to camera modules used in electronic devices.

2. Description of Related Art

Commonly, portable electronic devices such as mobile phones use cameras typically mounted to printed circuit boards by surface mounted technology. However, the cameras may separate from the printed circuit board when an exterior force is applied to the mobile phones.

Therefore, there is room for improvement within the art

BRIEF DESCRIPTION OF THE DRAWINGS

Many aspects of the exemplary camera module and electronic device using the camera module can be better understood with reference to the following drawings. The components in the various drawings are not necessarily drawn to scale, the emphasis instead being placed upon clearly illustrating the principles of the exemplary chip card holder and electronic device using the chip card holder. Moreover, in the drawings, like reference numerals designate corresponding parts throughout the diagrams.

DETAILED DESCRIPTION

Figure 1:
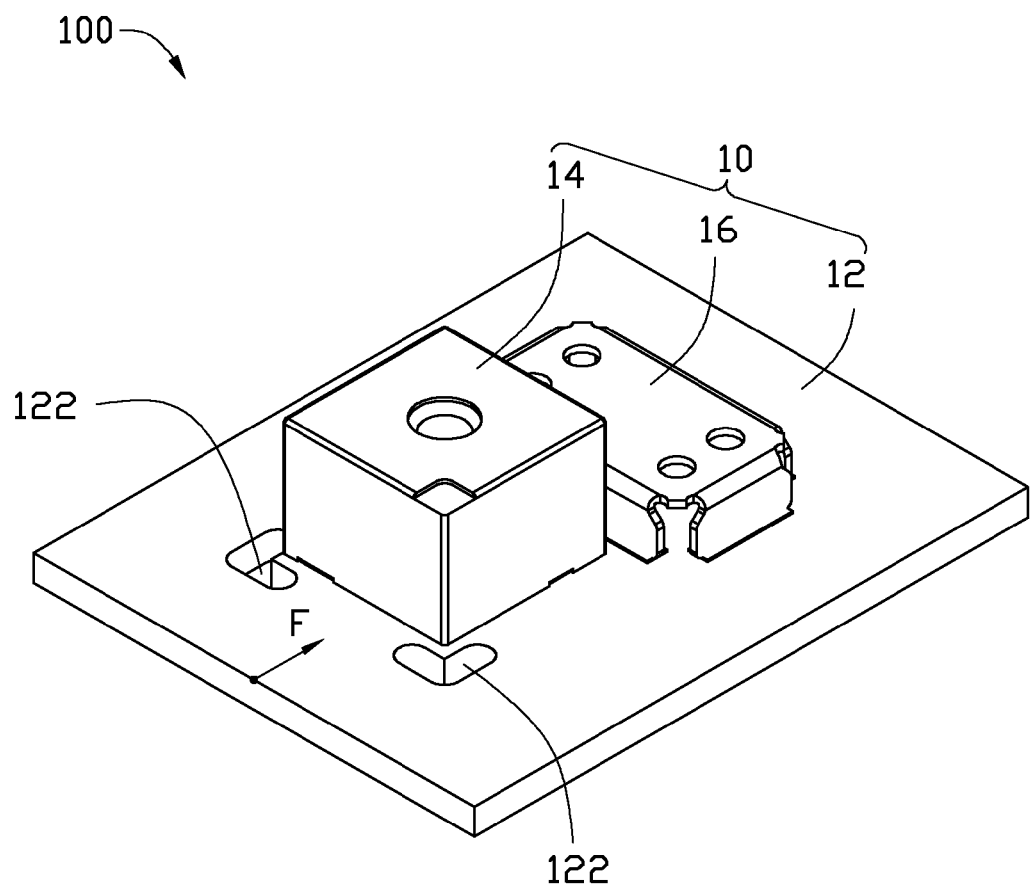
FIG. 1 is an assembled view of an electronic device with a camera module.

Referring to FIG. 1, an electronic device 100 (e.g., mobile phone) includes a camera module 10. The camera module 10 includes a printed circuit board (PCB) 12 and a camera 14. The camera 14 may be mounted to the PCB 12 by surface mounted technology.

Figure 3:
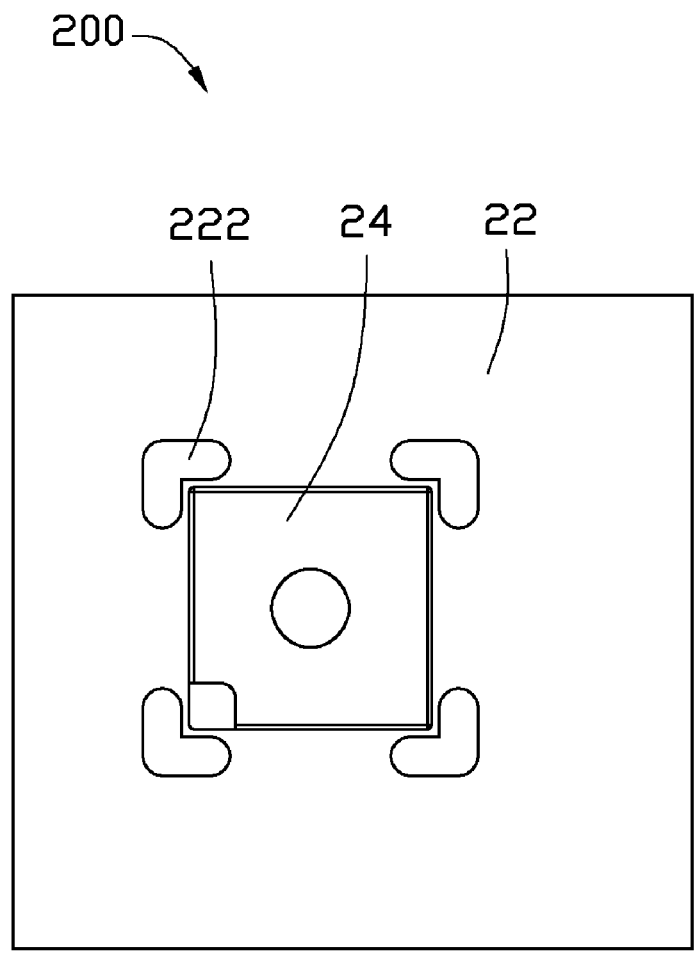
FIG. 3 is a planar view of another camera module.

In this exemplary embodiment, the PCB 12 defines at least one cut-out 122 respectively located near the camera 14, such as located at one corner of the camera 14. Each at least one cut-out 122 may have different shapes, such as L-shaped. When an exterior force F bumps the electronic device 100, the PCB 12 may be distorted, generating a stress. As the PCB 12 defines the at least one cut-outs 122, the stress generated by the PCB 12 will be concentrated on the at least one cut-out 122 to protect the camera 14 from separating from PCB 12. In the exemplary embodiment shown in FIG. 3, an electronic device 200 has a PCB 22 defining four at least one cut-out 222, each respectively located at one corner of a camera 24.

Figure 2:
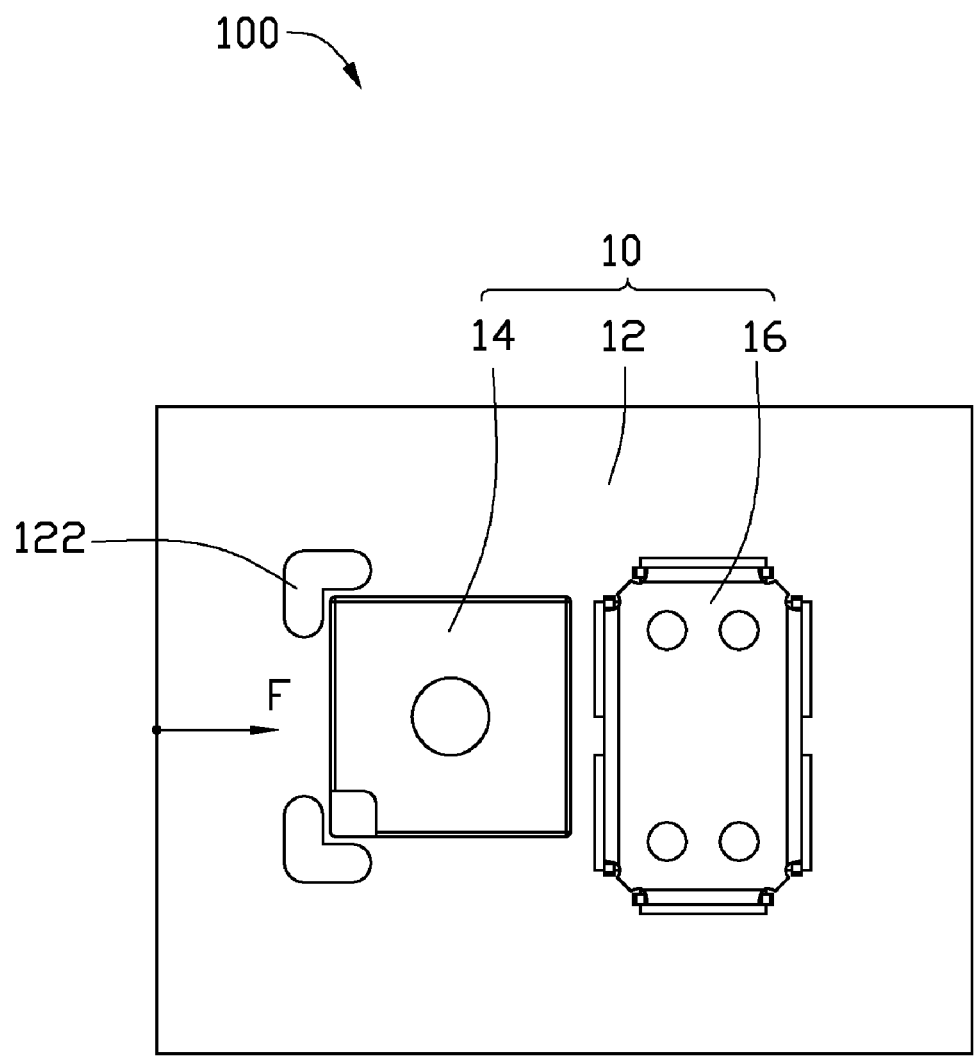
FIG. 2 is a planar view of the electronic device of FIG. 1.

Referring to FIGS. 1 and 2, the camera module 10 may further include a strengthening board 16 attached (e.g., adhered) to the PCB 12 to strengthen the PCB 12. In this exemplary embodiment, the strengthening board 16 is located at one side of the camera 14 opposite to the at least one cut-out 122.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera module comprising:
a printed circuit board; and
a camera mounted to the printed circuit board;
wherein the printed circuit board further defines at least one cut-out located near the camera, when the printed circuit board is distorted by an exterior force, a stress is applied to the printed circuit board, the stress is concentrated at the cut-out, the at least one cut-out being substantially L-shaped.

2. The camera module of claim 1, wherein each at least one cut-out is located at a side of the camera.

3. The camera module of claim 2, further comprising a strengthening board mounted to the printed circuit board.

4. The camera module of claim 3, wherein the strengthening board is located on a side of the camera opposite to the at least one cut-out.

5. The camera module of claim 4, wherein the printed circuit board further defines three at least one cut-outs, the cut-outs respectively located near corners of the camera.

6. An electronic device comprising:
a camera module comprising:
a printed circuit board; and
a camera mounted to the printed circuit board;
wherein the printed circuit board further defines at least one cut-out located near the camera, when the printed circuit board is distorted by an exterior force, a stress is applied to the printed circuit board, the stress is concentrated at the cut-out, the at least one cut-out being substantially L-shaped.

7. The electronic device of claim 6, wherein the at least one cut-out is located at a side of the camera.

8. The electronic device of claim 7, further comprises a strengthening board mounted to the printed circuit board.

9. The electronic device of claim 8, wherein the strengthening board locates at another side of the camera opposite to the at least one cut-out.

10. The electronic device of claim 9, wherein the printed circuit board further defines three at least one cut-outs, the at least one cut-outs respectively locate near one corner of the camera.

* * * * *